US005685875A

United States Patent [19]
Hlavinka et al.

[11] Patent Number: 5,685,875
[45] Date of Patent: Nov. 11, 1997

[54] FLUID SAMPLING DEVICE FOR CLOSED COLLECTION SYSTEMS

[75] Inventors: Dennis J. Hlavinka, Golden; Robert Lee White, Kittridge; Todd Curtis Green, Lakewood, all of Colo.

[73] Assignee: Cobe Laboratories, Inc., Lakewood, Colo.

[21] Appl. No.: 484,835

[22] Filed: Jun. 7, 1995

Related U.S. Application Data

[63] Continuation of Ser. No. 104,343, Aug. 9, 1993, Pat. No. 5,496,301, which is a continuation-in-part of Ser. No. 21,507, Feb. 23, 1993, Pat. No. 5,345,070, which is a continuation-in-part of Ser. No. 952,951, Sep. 25, 1992, abandoned.

[51] Int. Cl.$^6$ .................................................. A61B 19/00
[52] U.S. Cl. ........................ 604/409; 604/408; 604/403; 604/410; 128/760; 128/DIG. 24
[58] Field of Search ........................ 604/403, 407–410; 128/760, 762, 763, DIG. 24

[56] References Cited

U.S. PATENT DOCUMENTS 2,950,716  8/1960  Bellamy .
3,304,977  2/1967  Hammons ........................ 604/409
3,463,357  8/1969  MacLean ........................ 604/409
4,978,446  12/1990  Lobdell .

OTHER PUBLICATIONS

Product Literature: Haemonetics Mobile Collection System Owner's Operating and Maintenance Manual (Dec. 1, 1991, Rev. B). Haemonetics Corporation—Braintree, Massachusetts, 3 pages.

*Primary Examiner*—P. Zuttarelli
*Attorney, Agent, or Firm*—Greenlee, Winner and Sullivan, P.C.

[57] ABSTRACT

A method and device for sampling biological fluids during collection without opening the functionally closed collection system, thereby compromising the sterility of the collected fluid. A sample bag connected to a fluid line or collection reservoir is filled coincident with fluid collection, then hermetically sealed and physically separated from the collection system using a radio frequency tubing sealer. A vacuum tube collection device is attached to the sample bag to minimize exposure to the fluid during sample handling and processing.

17 Claims, 6 Drawing Sheets

FLUID SAMPLING DEVICE FOR CLOSED COLLECTION SYSTEMS

RELATED APPLICATION

This application is a continuation of U.S. patent application Ser. No. 08/104,343 filed Aug. 9, 1993, now U.S. Pat. No. 5,496,301 which is a continuation-in-part of U.S. patent application Ser. No. 08/021,507 filed Feb. 23, 1993, now U.S. Pat. No. 5,345,070 which is a continuation-in-part of U.S. patent application Ser. No. 07/952,951, filed Sep. 25, 1992 now abandoned. U.S. Ser. No. 08/104,343, U.S. Ser. No. 08/021,507 and U.S. Ser. No. 07/952,951 are incorporated herein by reference.

FIELD OF THE INVENTION

The present invention relates to a device for sampling biological fluids during collection using a closed collection system. More particularly, the invention relates to a device for sampling blood or separated blood components during collection without "opening" the collection tubing system and thereby compromising the sterile fluid pathway or exposing the user to potentially contaminated blood or blood product.

BACKGROUND OF THE INVENTION

Various techniques are known in the art for withdrawing samples of biological fluids during collection. Sampling systems designed for blood sampling during blood donation include, for example, a blood sample bag preconnected to the blood donor line (U.S. Pat. No. 2,950,716) and a preconnected vacuum tube collector (ADAM Medical Products Ltd.; Ashdod, Israel). Both fluid sampling systems involve "opening" the collection tubing network tea removable sample container, however, and thus compromise the sterile fluid pathway. The potential for bacterial contamination of the collected product thus limits use of these direct sampling devices to the sampling of nonperishable fluids, i.e., fluids destined for immediate refrigeration or use.

Sampling techniques and devices designed for use with "closed" collection systems have also been proposed. As used herein, a "closed" collection system refers to a functionally closed fluid collection system sealed to ensure fluid sterility either by hermetically sealing the entire system or by providing sterile barrier filters at all connections to the collection system. U.S. Pat. No. 4,978,446 illustrates a functionally closed system employing a sterile barrier filter. Closed collection systems are typically used to collect biological fluids not destined for immediate transfusion or processing, or substances whose chemical or physical integrity is compromised by cooling. Sampling devices adapted for closed collection systems generally comprise a sample inlet tube positioned between the sample container and the fluid pathway, said inlet tube comprising a clamping means to seal off the sample reservoir from the sterile fluid pathway prior to withdrawing the sample.

Although these sampling devices have been successfully used to sample donor whole blood during blood and platelet collection, such devices are deficient in several respects. First, none of these systems assure a hermetic fluid-tight seal between the sample reservoir and the fluid pathway. The clamp mechanism can fail during operation causing leakage of contaminated fluid into the sterile fluid pathway, or the operator can inadvertently fail to seal off the fluid pathway from the sample reservoir prior to removing a sample. In either event, the collected product must be immediately processed or discarded. Second, removal of the sample reservoir requires cutting the sample inlet tube using a knife or scissors, a procedure which exposes the operator to contact with the fluid which may be infectious or otherwise hazardous. The use of the knife or scissors also increases the time required. The contaminated knife or scissors must be handled with care to avoid contact with the fluid, and must be cleaned or sterilized after each use. Third, after the sample reservoir is removed from the collection system, the fluid is transferred from the sample container into test tubes for analysis, a procedure which creates air-borne particles and splashing, again exposing the operator to potentially hazardous fluid. Alternatively, transfer to test tubes is accomplished using conventional hypodermic needles and syringes. Although this latter method minimizes fluid spillage, it generates used needles and the problems associated therewith, including disposal concerns and the risk of accidental punctures.

A need therefore exists for a device for removing biological fluid samples during collection without opening the collection tubing system and thereby compromising the sterile fluid pathway, and which also minimizes exposure to the potentially infectious or hazardous fluid during sample handling and processing.

SUMMARY OF THE INVENTION

The present invention provides a safe and efficient method for removing biological fluid samples during collection without opening the closed collection system, thereby impairing the sterility of the collected fluid. A sample bag adjoining the fluid collection reservoir is filled coincident with fluid collection, then hermetically sealed and physically separated from the fluid collection reservoir for analysis. The sealing and separation procedures are accomplished using a radio frequency tubing sealer as described in U.S. Pat. No. 5,345,070. In accordance with this aspect of the invention, an insulating sleeve is installed around the outside of the sample bag at the segment adjoining the fluid collection reservoir. The tubing sealer is then used to compress and heat the bag at the location of the insulating sleeve. The insulating sleeve causes the plastic in the bag to retain sufficient heat to both seal the bag, creating a hermetic fluid-tight seal between the sample bag and collection reservoir, and to create a thin, easily torn, web between the sealed bag and reservoir. A plurality of sample bags and insulating sleeves may be used to obtain multiple fluid samples.

Another significant aspect of the present invention is to provide a safe and efficient method for removing biological fluid samples during collection without opening the collection tubing system, thereby impairing the sterility of the fluid pathway. In accordance with this aspect of the invention, at least one sample tube connected to the sterile fluid pathway is filled, then hermetically sealed and physically separated from the fluid pathway using a radio frequency tubing sealer and insulating sleeve, as described above. In accordance with this aspect of the invention, a hermetic fluid-tight seal is created between the sample tube and sterile fluid pathway. A plurality of sample tubes may be used to obtain multiple samples either simultaneously or throughout the collection process.

Still another significant aspect of the present invention is to minimize exposure to the sample fluid during sample processing by incorporating a vacuum tube collection device, such as a Vacutainer™-brand holder available from Becton-Dickenson, into the sample bag. The vacuum tube collection device as used herein comprises a needle encapsulated within a resealable elastomeric sheath (e.g., latex or polyurethane) to prevent fluid leakage, and further comprises a cylindrical holder or shield around the enclosed needle to prevent accidental needle punctures. To withdraw a sample, an evacuated test tube comprising a penetrable septum, such as a Vacutainer™-brand collection tube, is inserted into the holder. The sample goes directly from collection to analysis, eliminating the open transfer step previously employed during sample preparation.

In a preferred embodiment, the fluid sampling device is used to sample donor whole blood and/or blood platelets during platelet collection, such as with the Spectra™ platelet collection system manufactured by the assignee of the present invention. Aseptic collection and sampling is especially important during platelet collection since the product requires maintenance at room temperature.

The exact nature of this invention as well as other features and advantages thereof will be readily apparent from consideration of the specification, including the drawing. Those of skill in the art will appreciate that the invention described herein is susceptible to many modifications and variations without departing from its scope as defined by the appended claims.

BRIEF DESCRIPTION OF THE DRAWING

The accompanying drawing illustrates preferred embodiments of the invention, wherein.

DESCRIPTION OF THE PREFERRED EMBODIMENTS

Figure 1:
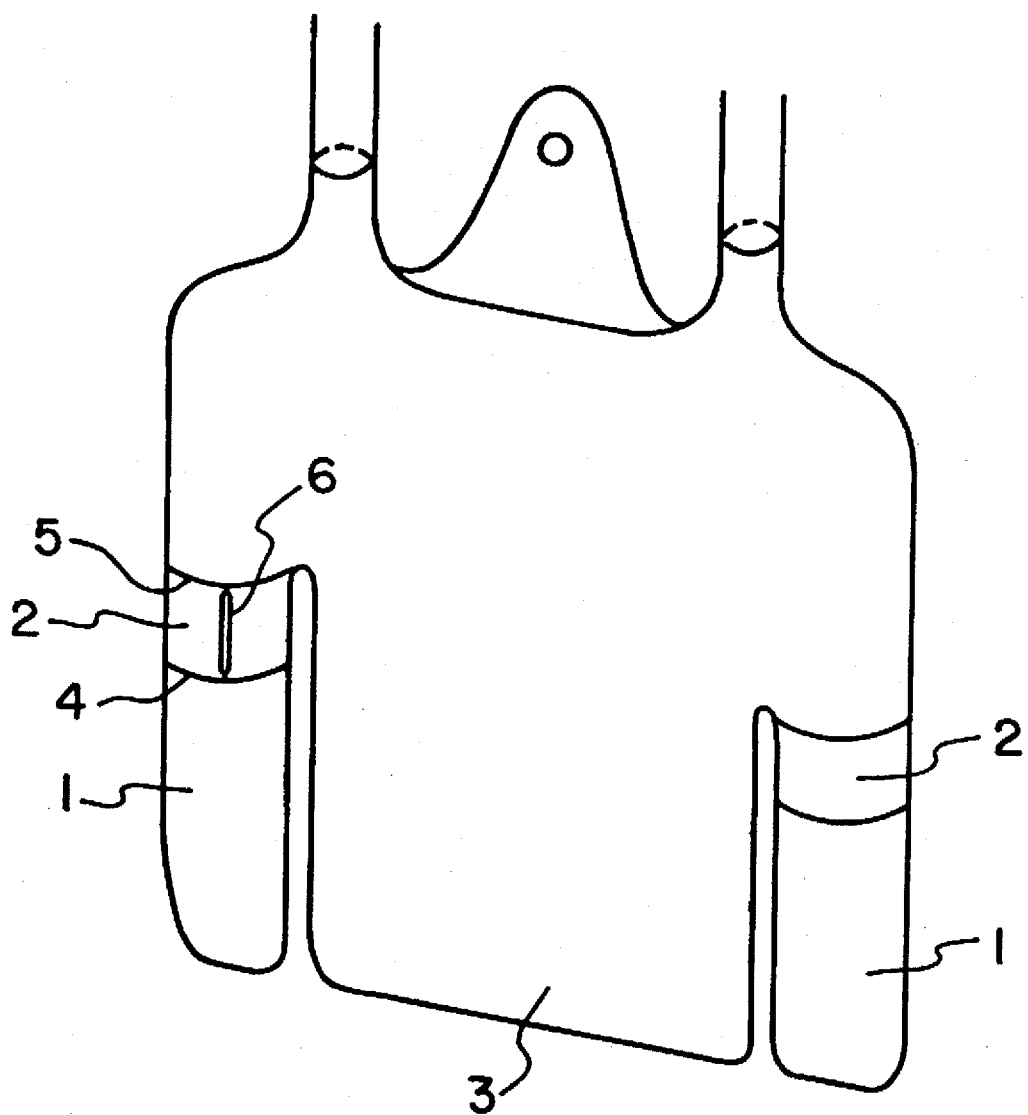
FIG. 1 is a perspective view of the fluid sampling device in an embodiment of the present invention.

Referring now to the drawings, like numbers indicate like features and the same number appearing in more than one figure refers to the same element.

FIG. 1 illustrates a sample bag 1, with a thermal insulating sleeve 2 installed thereon, connected to a fluid collection reservoir 3 in the fluid sampling device of the present invention. The sample bag 1 and fluid collection reservoir 3 are formed of a flexible thermoplastic material having a relatively high dielectric loss coefficient so that it is excited and heated in the presence of a radio frequency (RF) electric field.

The thermal insulating sleeve 2 comprises a tube-like structure having a first end 4 and a second end 5 with an inside dimension or diameter sufficiently large that it will fit over the outside diameter of the sample bag 1. The insulating sleeve 2 thus surrounds and conforms to the shape of the sample bag 1. The insulating sleeve 2 is a flexible or semi-rigid cylindrical tube having a circular or oblong cross sectional configuration which conforms to the shape of the sample bag. It has been found that if the inside dimension of the thermal insulating sleeve 2 is sufficiently large to fit over the outside diameter of the sample bag 1, the actual inside dimension is not critical. The insulating sleeve 2 is formed of a material that has low dielectric loss coefficient so that it is not excited and heated in the presence of an RF electric field. The insulating sleeve has an insulation value and wall thickness selected to retain sufficient heat in the thermoplastic material of the sample bag 1 so that when the sample bag is welded to form a seal separating it from the fluid collection reservoir 3, a thin, easily tearable web is formed. The thin web facilitates physically separating the sample bag 1 and the fluid collection reservoir 3 from each other while maintaining fluid-tight seals on both the sample bag 1 and the collection reservoir 3.

In a preferred embodiment, the thermal sleeve 2 is formed from a segment of polypropylene tubing having an inside diameter of 0.208 inches and a wall thickness of between 0.0055 inches and 0.0070 inches. Polypropylene insulating sleeves 2 having wall thicknesses of 0.0050 and 0.0080 inches have also been successfully used. The insulating sleeve 2 is preferably installed on the sample bag 1 during the manufacture of the sample bag 1 and fluid collection reservoir 3 by slipping the insulating sleeve over the lower end of the sample bag.

The thermal insulating sleeve 2 may optionally (but preferably does not) have a slit 6 extending through the wall of the insulating sleeve and further extending from the first end 4 to the second end 5. The slit 6 may be longitudinally straight and parallel to an axis of the sleeve 2, or it may have a spiral configuration or a vee configuration. The slit 6 permits installing the insulating sleeve 2 at a desired sealing location along the sample bag 1 by deforming the plastic material of the insulating sleeve to spread the slit to a size at least as large as the outside diameter of the sample bag.

In an alternative embodiment not illustrated by the accompanying figures, the sample bag 1 is positioned near the top of the fluid collection reservoir 3 and projects upward with respect thereto.

Figure 2:
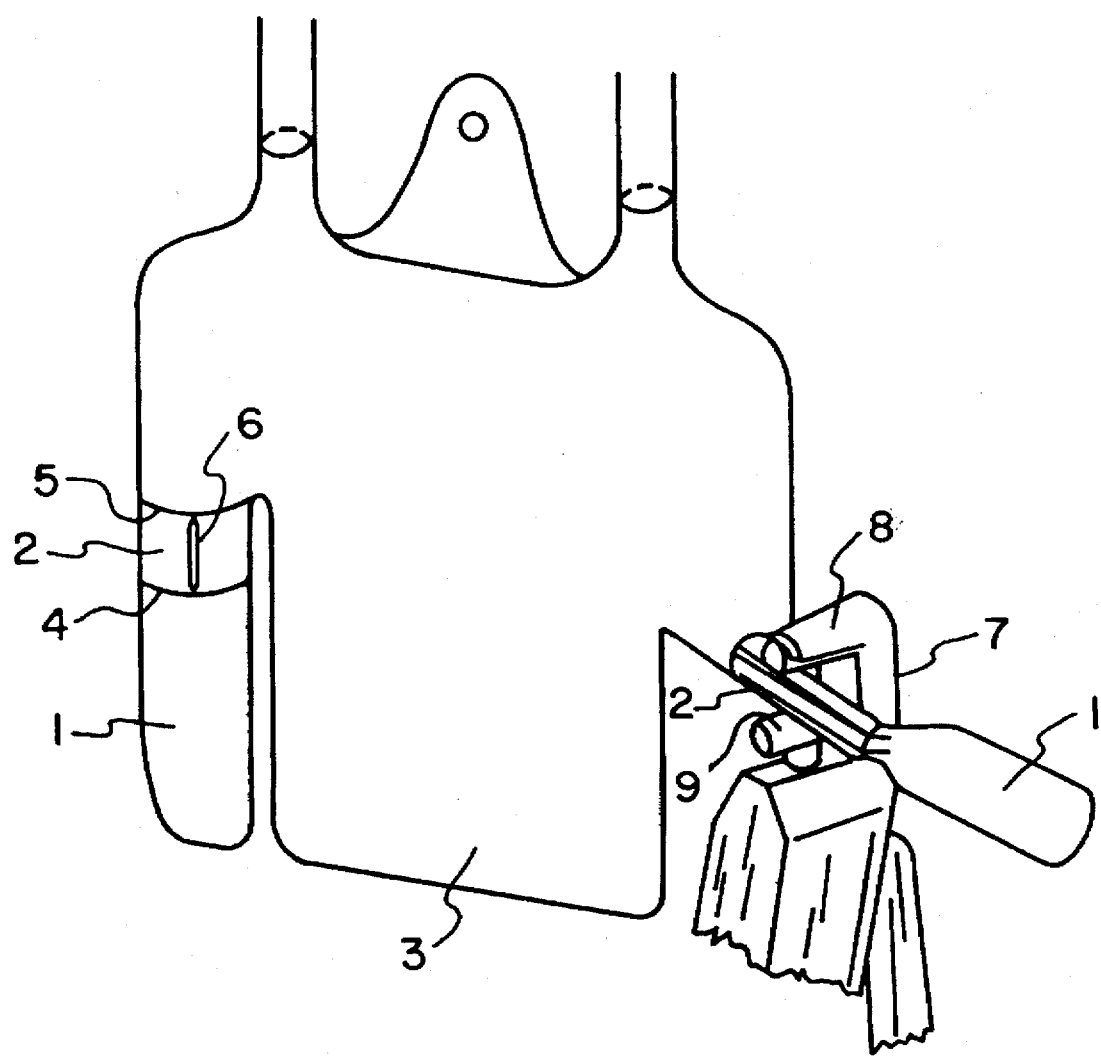
FIG. 2 illustrates the use of a tubing sealer and an insulating sleeve to seal a sample bag and create a thin, easily tearable web in accordance with the present invention.

FIG. 2 illustrates the use of an RF tubing sealer 7 and a thermal insulating sleeve 2 to seal a sample bag 1 and create a thin, easily tearable web in accordance with the present invention. The RF tubing sealer 7 may be of the type described in U.S. Pat. No. 4,013,860, issued Mar. 22, 1977 to Hosterman et al. for a "Hand Held Electro-Mechanism Sealer," and manufactured by Engineering and Research Associates, Inc., of Tucson, Ariz., as Sebra™ Model No. 2380. The sample bag 1 with the insulating sleeve 2 installed thereon is placed between an upper jaw 8 and a lower jaw 9 of the tubing sealer 7. The jaws are moved towards each other by a mechanism (not shown) of the tubing sealer 7 until they come into contact with the surface of the insulating sleeve 2. The jaws 8 and 9 are further moved towards each other, squeezing and flattening the sample bag 1 and the insulating sleeve 2. The jaws 8 and 9 compress the insulating sleeve 2 and sample bag 1 until the sample bag is squeezed tight, interrupting fluid communication between the sample bag 1 and the fluid collection reservoir 3. RF energy is applied to the upper jaw and lower jaw 8 and 9, respectively, to create an electric field between the upper jaw 8 and the lower jaw 9.

The electric field established by applying RF energy to the jaws 8 and 9 causes dielectric heating and resultant melting of the thermoplastic material of the sample bag 1. With the sides of the sample bag 1 contacting each other at the sealing location, the melting causes the sides to join and form a hermetic seal at the sealing location permanently preventing fluid communication between the sample bag 1 and the fluid collection reservoir 3. The sample bag 1 and the fluid collection reservoir 3 are physically joined by a thick web of thermoplastic material. With the insulating sleeve 2 in place, sufficient heat is retained in the thermoplastic material of the sample bag 1 so that further melting occurs at the sealing location as the jaws 8 and 9 are moved toward each other. This additional melting forms a thin, easily tearable web between the sample bag 1 and the fluid collection reservoir 3, leaving a hermetic seal on both the bag and the reservoir. The thin web may then be manually torn to physically separate the sample bag 1 from the fluid collection reservoir 3.

Figure 3:
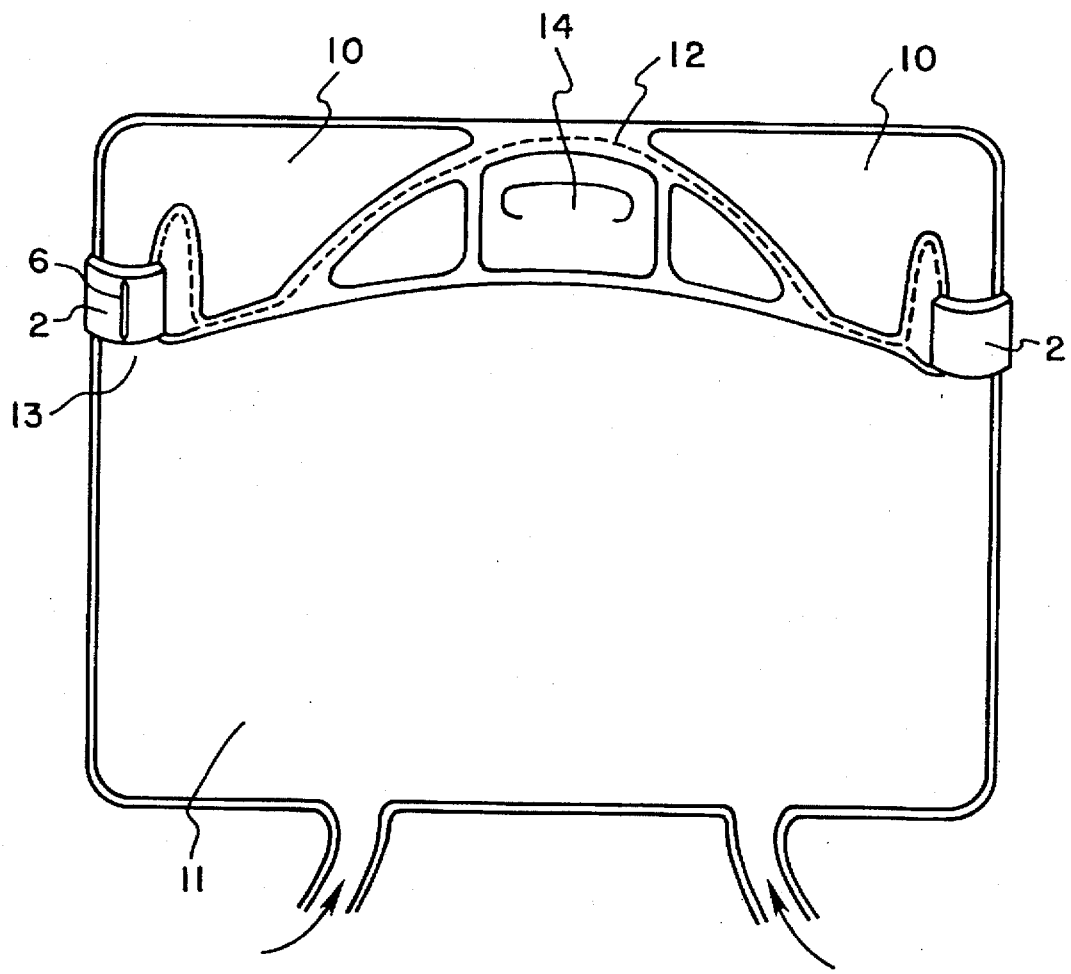
FIG. 3 illustrates an alternative embodiment of the fluid sampling device of the present invention.

FIG. 3 illustrates an alternative preferred embodiment of the present invention. In this alternative preferred embodiment, a sample chamber 10, with an insulating sleeve 2 installed thereon, is removably connected to a fluid collection bag 11 by a perforated border 12. Following fluid collection, the fluid collection bag 11 is inverted causing fluid to enter the sample chamber 10 from the fluid collection bag 11 through an aperture 13. The sample chamber 10 is then hermetically sealed above the aperture 13 to prevent fluid communication between the sample chamber 10 and the fluid collection bag 11 using a radio frequency tubing sealer, as described above. The perforated border 12 is then manually torn to physically separate the sample chamber 10 from the fluid collection bag 11. As illustrated in FIG. 3, a plurality of sample chambers 10 and insulating sleeves 2 may be used to obtain multiple fluid samples. This alternative embodiment optionally includes a collection bag hanger 14 for hanging the collection bag 11, also as illustrated.

Figure 4:
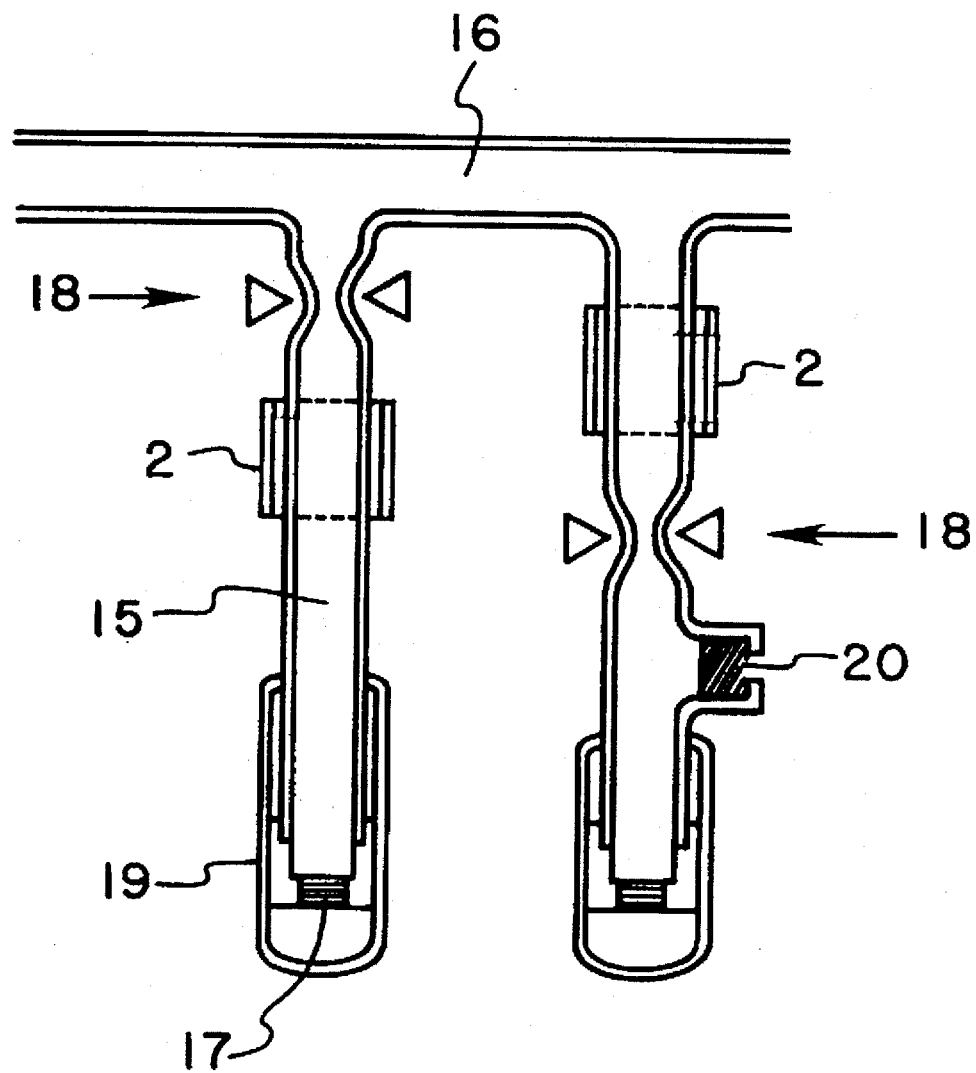
FIG. 4 illustrates a second alternative embodiment of the fluid sampling device of the present invention.

FIG. 4 illustrates yet another alternative embodiment of the present invention. In this alternative preferred embodiment, a sample tube 15, with an insulating sleeve 2 installed thereon, is connected at the proximal end to a fluid line 16. The sample tube 15 is a typical flexible thermoplastic medical tube. During sample collection, a clamping means 18 positioned near the proximal end of the sample tube 15 is opened, and trapped air escapes through a hydrophobic filter 17 enclosed within a plastic cap 19, positioned at the distal end of the sample tube 15. After sample collection, the clamping means 18 is closed and the sample tube 15 is hermetically sealed and separated from the fluid line 16 using a radio frequency tubing sealer, as described above. As illustrated in FIG. 4, a plurality of sample tubes 15 and insulating sleeves 2 may be used to obtain multiple fluid samples, either simultaneously or periodically throughout the collection process. The insulating sleeve 2 may be positioned above or below the clamping means 18 relative to the fluid line 16. Also as illustrated, this alternative embodiment optionally includes a sample port, such as a rubber septum 20, to remove test samples for analyses.

Figure 5:
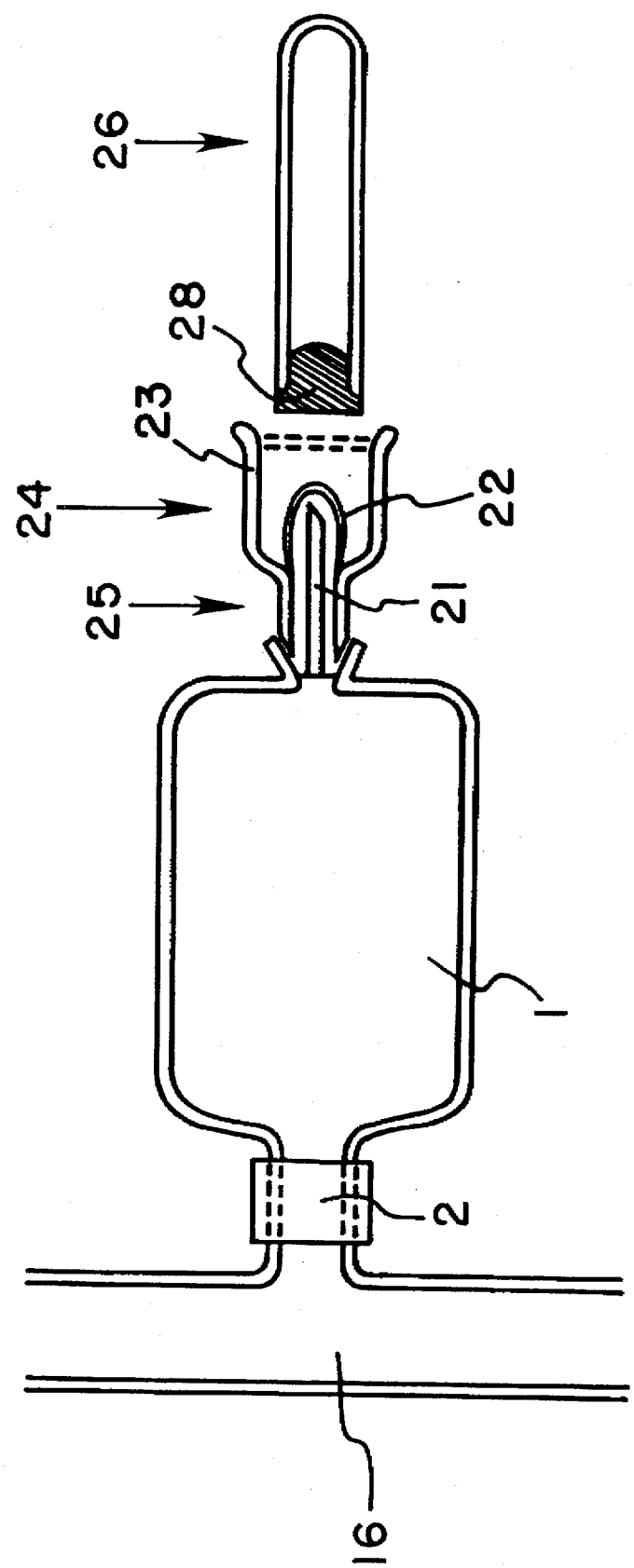
FIG. 5 illustrates a vacuum tube collection device connected to the sample bag in accordance with the present invention.

FIG. 5 illustrates a vacuum tube collection device, such as a Vacutainer™-brand collection tube and a Vacutainer™-brand holder, in combination with the sample bag 1 and tubular insulating sleeve 2 of the present invention. The vacuum tube holder 24 comprises a needle 21 encapsulated within a resealable elastomeric sheath 22 and a cylindrical plastic shield 23 to prevent fluid leakage and contact with the needle. The vacuum tube 26 is an evacuated tube closed by a septum, such as a Vacutainer™-brand collection tube. A Luer adapter 25 can be used to affix the Vacutainer™-brand holder 24 to the sample bag 1, as shown in FIG. 5. The Vacutainer™-brand tube 26 is inserted into the Vacutainer™-brand holder 24 to remove a test sample for analysis. A system such as shown in FIG. 5 retains the strict nature of a closed system while providing samples for laboratory analysis without the danger of inadvertent fluid spillage or needle sticks.

Figure 6:
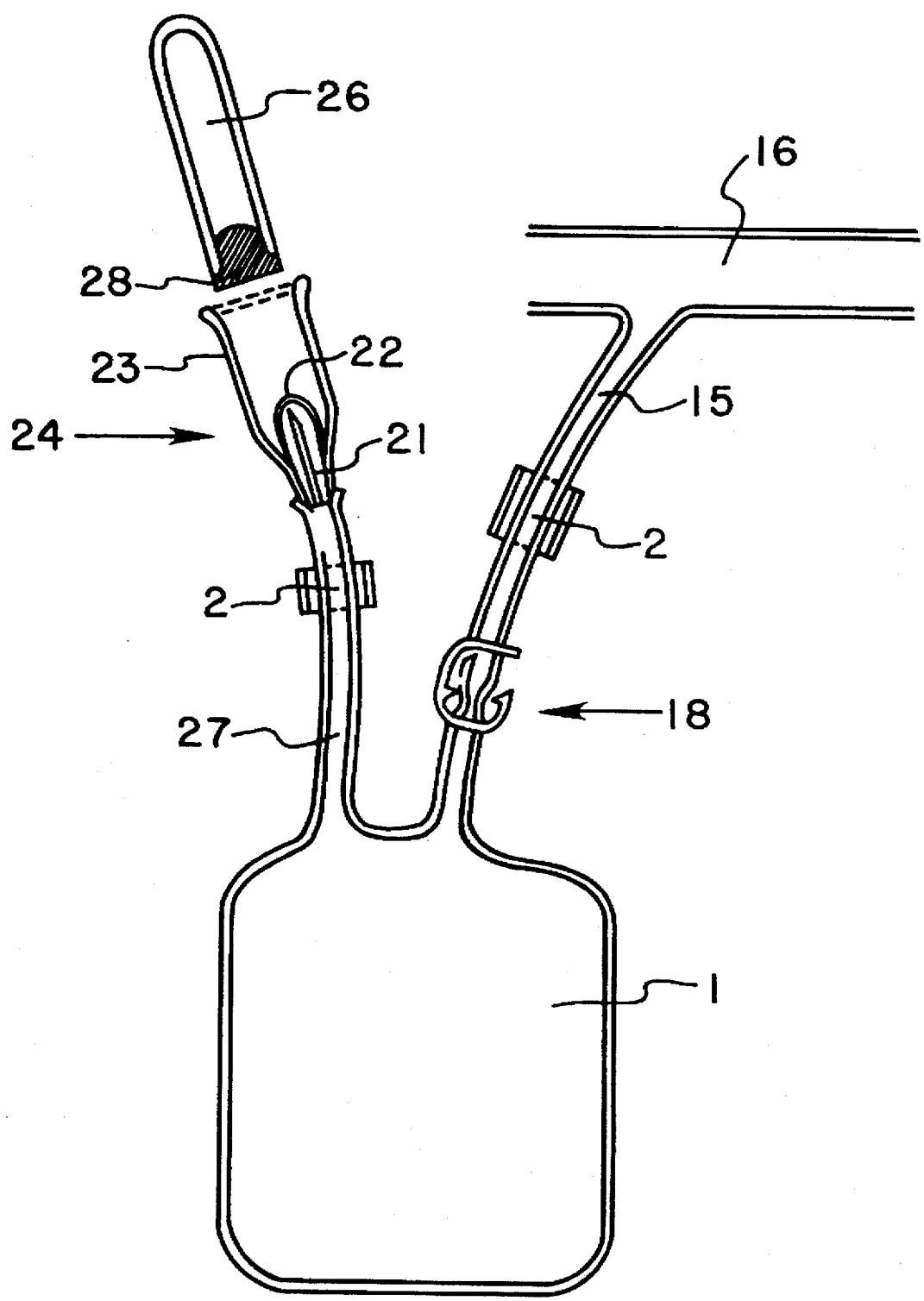
FIG. 6 illustrates an alternative embodiment of the fluid sampling device of the present invention.

FIG. 6 illustrates an alternative embodiment of the present invention comprising a vacuum tube collection device in combination with the sample bag 1. The vacuum tube collection device is preferably a Vacutainer™-brand collection tube and a Vacutainer™-brand holder, as described above. In this alternative preferred embodiment, a sample inlet tube 15, with a clamping means 18 and an insulating sleeve 2 installed thereon, is connected at its proximal end to a fluid line 16 or a fluid collection receptacle such as receptacle 11 in FIG. 3. The sample bag 1 is connected to the vacuum tube collection device by a sample outlet tube 27. Both sample inlet tube 15 and a sample outlet tube 27 are typical flexible thermoplastic medical tubes. During sample collection, fluid flow into sample bag 1 is controlled using a clamping means 18. After sample collection, the clamping means 18 is closed and the sample tube 15 is optionally sealed and separated from the fluid line 16 using a radio frequency tubing sealer, as described above. To withdraw a sample for analysis, an evacuated collection tube 26, such as a Vacutainer™-brand collection tube, is inserted into the vacuum tube holder 24. The needle 21 then pierces the resealable elastomeric sheath 22 and the penetrable rubber septum 28, thus allowing fluid flow into the collection tube 26. If desired, an insulating sleeve 2, such as shown in FIG. 6, can be used to seal the sample bag 1 from the vacuum tube collection device after a sample has been withdrawn for analysis. Although the embodiment illustrated in FIG. 6 comprises an insulating sleeve 2 on each of the sample inlet tube 15 and the sample outlet tube 27, both insulating sleeves are optional. Moreover, the insulating sleeve 2 on sample tube 15 may be positioned either above or below the clamping means 18 relative to the sample bag 1.

In each of the embodiments of the present invention, one or more additional seals may be made with the radio frequency tubing sealer at locations separated from but closely adjacent to the insulating sleeve 2 to form two seals that have thick webs that are not easily tearable. Such seals would normally be made before making the seal at the insulating sleeve 2, in order to provide additional security against exposure to blood or blood products.

Obviously, many modifications and variations of the present invention are possible and will be evident to those of ordinary skill in the art. It is therefore to be understood that within the scope of the appended claims, the invention may be practiced in ways other than as specifically described herein.

We claim:

1. A device for collecting samples of fluids said device comprising:

a fluid collection bag having opposing ends, an entry tube in fluid communication with said fluid collection bag;

a hanger for said fluid collection bag;

a sample receptacle in fluid communication with said fluid collection bag; wherein:

said entry tube, hanger, and said sample receptacle are formed in a unitary construction with said fluid collection bag, the sample receptacle being formed on the opposite end of the bag from the entry tube.

2. The device of claim 1 wherein the unitary construction of the fluid collection bag, entry tube, hanger and sample receptacle comprises:

a first sheet of flexible plastic material; and a second sheet of flexible plastic material sealed to the first sheet of plastic material in a pattern that forms the fluid collection bag, entry tube, hanger, sample receptacle and perforated border.

3. The device of claim 2 wherein the second sheet is sealed to the first sheet by heat welding.

4. The device of claim 1 wherein the sample receptacle is removably connected to said bag and hanger by a perforated border positioned between said sample receptacle and said fluid collection bag and hanger.

5. The device of claim 4 wherein the unitary construction of the fluid collection bag, entry tube, and hanger and sample receptacle comprises:

a first sheet of flexible plastic material; and a second sheet of flexible plastic material sealed to the first sheet of plastic material in a pattern that forms the fluid collection bag, entry tube, hanger, sample receptacle and perforated border.

6. The device of claim 5 wherein the second sheet is sealed to the first sheet by heat welding.

7. The device of claim 4 further comprising:

an aperture between said fluid collection bag and said sample receptacle wherein fluid from the entry tube enters the sample receptacle through the aperture.

8. The device of claim 7 further comprising:

an insulating sleeve on the sample receptacle above the aperture wherein said sleeve defines a sealing location for sealing said sample receptacle for removal from said fluid collection bag and hanger at said perforated border.

9. A tubing set for the collection or administration of blood or blood components, comprising:

a device for collecting samples of fluids in a fluid collection, said device comprising:

a fluid collection bag having opposite ends;

an entry tube in fluid communication with said fluid collection bag;

a hanger for said fluid collection bag;

a sample receptacle in fluid communication with said fluid collection bag; wherein:

said entry tube, hanger, and said sample receptacle are formed in a unitary construction with said fluid collection bag, the sample receptacle being formed on the opposite end of the bag from the entry tube.

10. The device of claim 9 wherein the unitary construction of the fluid collection bag, entry tube, hanger and sample receptacle comprises:

a first sheet of flexible plastic material; and a second sheet of flexible plastic material sealed to the first sheet of plastic material in a pattern that forms the fluid collection bag, entry tube, hanger, sample receptacle and perforated border.

11. The tubing set of claim 10 wherein the second sheet is sealed to the first sheet by heat welding.

12. The tubing set of claim 9 wherein the sample receptacle is removably connected to said bag and hanger by a perforated border positioned between said sample receptacle and said fluid collection bag and hanger.

13. The tubing set of claim 12 wherein the unitary construction of the fluid collection bag, entry tube, hanger and sample receptacle comprises:

a first sheet of flexible plastic material; and a second sheet of flexible plastic material sealed to the first sheet of plastic material in a pattern that forms the fluid collection bag, entry tube, hanger, sample receptacle and perforated border.

14. The device of claim 13 wherein the second sheet is sealed to the first sheet by heat welding.

15. A device for collecting samples of fluid said device comprising:

a fluid collection bag having opposite ends;

an entry tube in fluid communication with said fluid collection bag;

a hanger for said fluid collection bag;

a first sample receptacle in fluid communication with said fluid collection bag;

a second sample receptacle in fluid communication with said fluid collection bag;

a perforated border between said first sample receptacle and said bag and hanger and between said second sample receptacle and said bag and hanger, wherein said entry tube, hanger, first sample receptacle, and second sample receptacle are formed in a unitary construction with said fluid collection bag; the first and second sample receptacles being formed on the opposite end of the bag from the entry tube.

16. The device of claim 15 wherein the unitary construction of the fluid collection bag, entry tube, hanger and sample receptacle comprises:

a first sheet of flexible plastic material; and a second sheet of flexible plastic material sealed to the first sheet of plastic material in a pattern that forms the fluid collection bag, entry tube, hanger, sample receptacle and perforated border.

17. The device of claim 16 wherein the second sheet is sealed to the first sheet by heat welding.

* * * * *

UNITED STATES PATENT AND TRADEMARK OFFICE
CERTIFICATE OF CORRECTION

PATENT NO. : 5,685,875

DATED : November 11, 1997

INVENTOR(S) : Hlavinka et al.

It is certified that error appears in the above-identified patent and that said Letters Patent is hereby corrected as shown below:

<u>In the claims</u>:

In claim 5, line 1, delete "4" and replace with --1--.

In claim 9, line 4, after "collection" insert --bag--.

Signed and Sealed this

Seventeenth Day of February, 1998

Attest:

BRUCE LEHMAN

*Attesting Officer*

*Commissioner of Patents and Trademarks*